(No Model.)
H. S. SARONI.
Vapor Burner.
No. 240,551. Patented April 26, 1881.
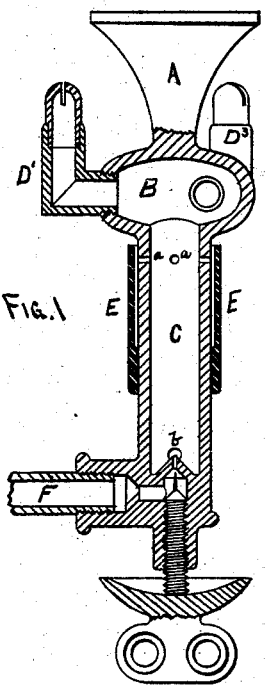
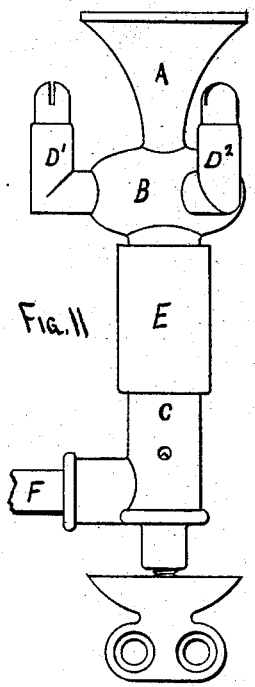
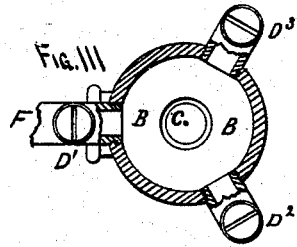
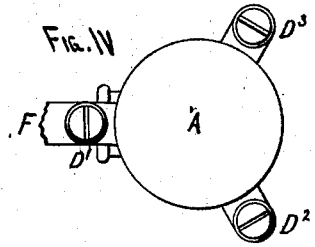
WITNESSES
Geo. E. Hussey
R. H. Speake
Herrman S. Saroni
INVENTOR.

UNITED STATES PATENT OFFICE.

HERRMAN S. SARONI, OF ST. PAUL, MINNESOTA.

VAPOR-BURNER.

SPECIFICATION forming part of Letters Patent No. 240,551, dated April 26, 1881.

Application filed December 9, 1880. (No model.)

*To all whom it may concern:*

Be it known that I, HERRMAN S. SARONI, of the city of St. Paul, county of Ramsey, and State of Minnesota, have invented a new and useful Improvement in Vapor-Burners, which improvement is fully set forth in the following specification, reference being had to the accompanying drawings.

My invention relates to that class of vapor-burners which is more especially intended for illuminating purposes, and particularly for use in street-lamps. My object is to produce a broad illuminating-flame in two or more directions from the burner, and to oppose them in such a manner that the intensity of the light is greatly increased thereby without adding to the consumption of vapor.

In the accompanying drawings, Figure I represents a sectional side elevation; Fig. II, a side elevation; Fig. III, a sectional view of the distributing and superheating chamber, and Fig. IV a plan view of the same.

A is a conductor of heat; B, a distributing and superheating chamber, with the tubes and burner-tips $D'$, $D^2$, and $D^3$.

C is a mixing-chamber, with apertures $a\ a$ and $b$.

E is a sleeve, open at the top and closed at the bottom, surrounding the mixing-chamber in such a manner as to form an annular chamber around it.

F is a generator, provided with the usual valve and heating-cup, to which the mixing-tube C is rigidly attached.

The mode of operation is as follows: A hydrocarbon fluid under suitable pressure is allowed to flow into the generator F, which, having previously been heated, converts the liquid at once into vapor, which passes through the generator-valve into the mixing-chamber C, absorbing on its way (through the aperture $b$) a certain amount of atmospheric air. Thence the greater part of the mixed vapor passes into the chamber B, issuing through the tubes and burner-tips $D'$ $D^2$ $D^3$, where it is ignited and yields a flame of intense brilliancy. A smaller portion of the mixed vapor passes through the apertures $a\ a$, impinging against the sleeve E, issuing as a non-luminous flame under the chamber B, where it superheats the mixed vapor, and by conduction conveys heat to the generator F sufficient to continue the vaporizing process.

The conductor A, which absorbs heat from the surrounding flames, is only necessary where the auxiliary jets $a\ a$ do not supply heat enough to furnish the requisite amount of vapor.

Having thus described my invention, what I claim as new, and desire to secure by Letters Patent, is—

The combination of the chamber B, the tubes $D'$ $D^2$ $D^3$, the mixing-chamber C, with the apertures $a\ a$ and $b$, and the sleeve E, with the generator F, all arranged to operate together as above specified.

HERRMAN S. SARONI.

Witnesses:
 CYRUS J. THOMPSON,
 HARRY VANE RUTHERFORD.